Patented Mar. 11, 1941

2,234,202

UNITED STATES PATENT OFFICE 2,234,202

VULCANIZED PRODUCT FROM RUBBER AND METHOD OF VULCANIZING RUBBER

David Spence, Monterey, Calif., assignor to The B. F. Goodrich Company, New York, N. Y., a corporation of New York No Drawing. Original application May 11, 1937, Serial No. 141,971. Divided and this application January 11, 1939, Serial No. 250,419

10 Claims. (Cl. 260—773)

This method relates to the art of rubber manufacture and has as its object the conversion of raw rubber and the like into products having the desirable characteristics of a vulcanized product.

The conventional method of vulcanizing rubber by heating it in the presence of sulphur is sometimes undesirable for one reason or another and the presence of sulphur or of compounds thereof in vulcanized rubber introduces serious disadvantages for many purposes. Hence, many proposals have been made of other vulcanizing agents, including nitro compounds such as nitroanthraquinone and halogen compounds such as chloranil which is a tetrachlor quinone.

I have discovered that a product having the properties of a soft vulcanized rubber may be produced by heating raw rubber with a quinone and that many of such substances, ineffective as vulcanizing agents in presence of air, are rendered quite effective if air (oxygen) is excluded. The quinones which I employ are preferably simple quinones containing no nuclear substituents other than hydrocarbon groups; that is, compounds containing a quinoid aromatic hydrocarbon nucleus which may be represented by the type formula =R= united to oxygen. Typical examples are benzoquinone, toluquinones, naphthoquinones, diphenoquinones and such like, as well as the corresponding compounds derived from aromatic hydrocarbons other than benzene. Many of these quinones are well known commercial products and others can be readily prepared by comparatively simple means from commercially available materials. Either para or ortho quinones may be used but the para quinones have been found to be the most effective.

When raw rubber is heated alone with these materials in presence of air, it is, in some cases at least, converted into more or less soft plastic products due, apparently, to the disintegration of the rubber macromolecule by oxidative processes. When, on the other hand, the heating is carried out in the absence of air as far as that is possible or in presence of an inert gas, such as nitrogen, the rubber is converted into a tough, and highly elastic product, more or less characteristic of a vulcanized rubber, and like vulcanized rubber more or less insoluble in the ordinary solvents for raw rubber. The compounds may be added to the rubber in any convenient manner, say by mixing in a closed internal mixer or by adding to rubber latex, and in a wide range of proportions, say from 0.2% to 15%, although other proportions may also be used. The proportions obviously will be chosen with regard to the activity of the particular quinone which is used and the character of the product to be produced.

As a specific example of one embodiment of the invention, a neutral latex is mixed with a solution of benzoquinone equivalent to 5% of the quinone, based on the rubber content of the latex. The quinone may be dissolved in warm alcohol to which water is added prior to mixing with the latex. The latex is afterwards poured on a porous plate to separate the water therefrom and the resulting sheet of solid rubber, after vacuum drying, is heated to a temperature of 100° C. for 5 hours in an atmosphere of oxygen-free nitrogen. The product thus obtained exhibits the strength and resiliency characteristics of a semi-vulcanized rubber. It is practically insoluble in the usual solvents for raw rubber, for example, in benzol 80% of the product remained undissolved after 14 days whereas only 30% of a sample of rubber from the same latex prepared without treatment remained undissolved in the same time interval. This same material when heated in presence of air gave a soft plastic mass, readily soluble in benzol.

In another example, 5% of 1,4 naphthoquinone in finely powdered form is mixed into rubber in the form of a cement contained in a closed mixer. The solvent for the rubber is afterwards removed by vacuum, and the rubber containing the naphthoquinone is heated for 4½ hours at 110° C. in a closed container from which the air has been completely replaced by nitrogen. The product is a tough, highly elastic sheet of vulcanized soft rubber, practically insoluble in the ordinary solvents for rubber, but swelling therein. If it is desired to shape the rubber at the same time it is vulcanized, it may be heated in a mold.

It will be clearly evident from the foregoing that the transformations effected in the physical properties of the rubber and characteristics of vulcanization have been brought about by (1) the reactive quinone structure of the compounds employed and are characteristic of such types of compounds (2) by eliminating the injurious effects of air (oxygen) as far as necessary throughout the process (3) independently of the presence of such vulcanizing agents as sulphur or of organic compounds containing reactive sulphur, nitro or halogen substituents.

The extent to which it may be necessary to eliminate the injurious effect of air during the process depends upon the reactivity of the quinone employed and the amount thereof, the nature of the other compounding constituents present, and the temperature of vulcanization—in other words, on the relative speeds of the two opposing reactions at any given temperature.

I have also found that products prepared in this way may be subjected to a further vulcanization by any of the well known means and while the invention has been described in detail with reference to its preferred embodiment only, it is to be understood that numerous modifications may be made without exceeding the scope of the invention.

This is a division of my application Serial No. 141,971, filed May 11, 1937.

I claim:

1. The process of imparting to rubber the physical properties of a vulcanized product which comprises heating rubber in the absence of sulfur with a quinone having no substituents in the aromatic nucleus other than hydrocarbon groups.

2. The process of imparting to rubber the physical properties of a vulcanized product which comprises heating rubber in the absence of sulfur with a para-quinone having no substituents in the aromatic nucleus.

3. The process of imparting to rubber the physical properties of a vulcanized product which comprises heating rubber in the absence of sulfur with a naphthoquinone having no substituents in the aromatic nucleus other than hydrocarbon groups.

4. The process of imparting to rubber the physical properties of a vulcanized product which comprises heating rubber in the absence of sulfur with 1,4 naphthoquinone.

5. The process of claim 1, in which the heating is carried out in the substantial absence of air.

6. The process of claim 3, in which the heating is carried out in the substantial absence of air.

7. A rubber composition comprising rubber which has been vulcanized by heating in the absence of sulfur with a quinone having no substituents in the aromatic nucleus other than hydrocarbon groups.

8. A rubber composition comprising rubber which has been vulcanized by heating in the absence of sulfur with a para-quinone having no substituents in the aromatic nucleus other than hydrocarbon groups.

9. A rubber composition comprising rubber which has been vulcanized by heating in the absence of sulfur with a naphthoquinone having no substituents in the aromatic nucleus other than hydrocarbon groups.

10. A rubber composition comprising rubber which has been vulcanized by heating in the absence of sulfur with 1,4 naphthoquinone.

DAVID SPENCE.